(12) United States Patent
Inagaki

(10) Patent No.: US 7,371,701 B2
(45) Date of Patent: May 13, 2008

(54) NONWOVEN FABRIC OF POLYESTER COMPOSITE FIBER

(75) Inventor: Kenji Inagaki, Ibaraki (JP)

(73) Assignee: Teijin Fibers Limited, Osaka (JP)

( * ) Notice: Subject to any disclaimer, the term of this patent is extended or adjusted under 35 U.S.C. 154(b) by 103 days.

(21) Appl. No.: 10/540,880

(22) PCT Filed: Dec. 26, 2003

(86) PCT No.: PCT/JP03/16965

§ 371 (c)(1),
(2), (4) Date: Jun. 27, 2005

(87) PCT Pub. No.: WO2004/063449

PCT Pub. Date: Jul. 29, 2004

(65) Prior Publication Data

US 2006/0057379 A1     Mar. 16, 2006

(30) Foreign Application Priority Data

Jan. 8, 2003 (JP) ............................. 2003-001876
Mar. 10, 2003 (JP) ............................. 2003-063148

(51) Int. Cl.
*D04H 1/00* (2006.01)
*B32B 25/10* (2006.01)
(52) U.S. Cl. ................... 442/361; 442/362; 428/296.7
(58) Field of Classification Search ................ 442/361, 442/362, 371
See application file for complete search history.

(56) References Cited

U.S. PATENT DOCUMENTS

| 6,090,731 | A | * | 7/2000 | Pike et al. | .................. 442/409 |
| 6,197,856 | B1 | | 3/2001 | Dean et al. | |
| 6,231,976 | B1 | | 5/2001 | Dean et al. | |
| 6,384,297 | B1 | * | 5/2002 | Colman et al. | ............. 604/364 |

FOREIGN PATENT DOCUMENTS

| EP | 1 110 988 A1 | 6/2001 |
| JP | 54-043295 | 4/1979 |
| JP | 54-045397 | 4/1979 |
| JP | 02-021918 A | 1/1990 |
| JP | 8-3819 A | 1/1996 |
| JP | 8-143657 A | 6/1996 |
| JP | 9-271617 A | 10/1997 |
| JP | 2000-319370 A | 11/2000 |
| JP | 2003-119270 A | 4/2003 |
| JP | 2003-128776 A | 5/2003 |
| WO | WO 01/00706 A1 | 1/2001 |
| WO | WO 02/068497 A1 | 9/2002 |

* cited by examiner

*Primary Examiner*—Lynda Salvatore
(74) *Attorney, Agent, or Firm*—Sughrue Mion, PLLC

(57) ABSTRACT

A nonwoven fabric of polyester composite fibers which has a satisfactory color tone (low value of b*). It is formed from short composite fibers obtained from a polyester polymer obtained with the following catalyst and a fusion-bondable polymer. The catalyst comprises: (1) a mixture of a phosphorus compound ingredient comprising a phosphorus compound represented by the formula (III) with a titanium compound ingredient comprising a titanium alkoxide represented by the following formula (I) and/or a product of the reaction of the titanium alkoxide with a carboxylic acid represented by the formula (II) or anhydride thereof; and/or (2) a product of the reaction of a phosphorus compound ingredient comprising a phosphorus compound represented by the formula (V) with a titanium compound ingredient comprising a titanium alkoxide (IV) represented by the formula (IV) and/or a product of the reaction of the titanium alkoxide with a carboxylic acid represented by the formula (III) or anhydride thereof

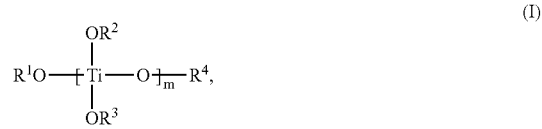

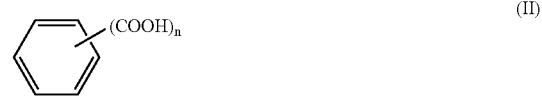

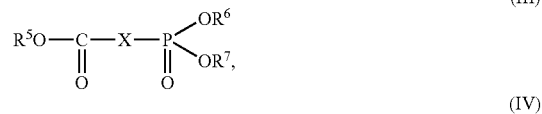

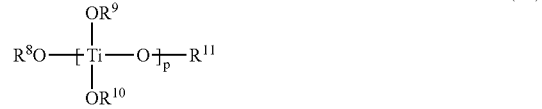

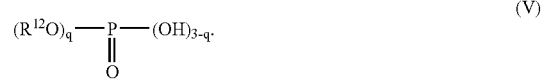

14 Claims, No Drawings

NONWOVEN FABRIC OF POLYESTER COMPOSITE FIBER

TECHNICAL FIELD

The present invention relates to a polyester-composite-fiber nonwoven fabric. More particularly, the present invention relates to a polyester-composite-fiber nonwoven fabric produced using a polyester resin having a good color tone and excellent melt spinnability. The polyester-composite-fiber nonwoven fabric of the invention is useful for such sheet materials for use in materials to be contacted with food as food packaging materials, black tea packs, green tea packs, filters for food (e.g., coffee filters), sheets for removing harshness generated from food oil filter sheets, kitchen wipers, base materials for reverse osmosis membranes, sanitary materials and filters for various beverages.

BACKGROUND ART

Polyester resins and, in particular, polyethylene terephthalate, polyethylene naphthalate, polytrimethylene terephthalate and polytetramethylene terephthalate are excellent in mechanical, physical and chemical properties, and thus the polyesters are widely utilized for fibers, films and other formed materials. For use in nonwoven fabrics in particular, polyesters are known to have excellent mechanical strength, dimensional stability, heat resistance and light resistance.

A polymer for fibers, as mentioned above and, for example, a polyethylene terephthalate, is usually produced by preparing ethylene glycol ester of terephthalic acid, and/or a polymer with a low polymerization degree of the ester, and reacting the products in the presence of a polycondensation catalyst at reduced pressure while the products are being heated, until the polymer has a given polymerization degree. Moreover, other polyesters such as a polyethylene naphthalate, a polytrimethylene naphthalate and a polytetramethylene terephthalate are produced by methods similar to that explained above.

For some types of polycondensation catalysts, it is well known that the quality of the polyesters thus obtained greatly depends on the catalysts. Antimony compounds have been most widely used as polycondensation catalysts for polyethylene terephthalate.

However, when an antimony compound is used, continuous melt spinning of polyester over a long period of time causes sticking and deposition of foreign matter around the periphery of the spinneret (hereinafter merely referred to as spinneret foreign matter). As a result, bending of molten polymer streams takes place to cause the problems that fluff formation, yarn breakage or uneven fiber physical properties appear. For a filament yarn of which the fiber physical properties must be utilized as much as possible, a solution to the above problems has been particularly desired.

Use of a titanium compound such as titanium tetrabutoxide for the purpose of avoiding the problem has been known. However, when such a compound is used, the polymer thus obtained shows poor thermal stability and drastically deteriorates during melting. Accordingly, fibers having a high mechanical strength are hard to obtain. Moreover, the thus obtained polyester is itself yellowed to cause the problem that the finally obtained fibers have an unsatisfactory color tone.

The following procedures have been disclosed as means for solving such problems: reaction products obtained by reacting a titanium compound with trimellitic acid are used as a catalyst for producing the polyester (see, e.g., Reference Patent 1); products obtained by reacting a titanium compound with a phosphorus acid ester are used as a catalyst for producing the polyester (see, e.g., Reference Patent 2). Although these methods surely improve the melt heat stability of the polyester to a certain degree, the effects of improvement are inadequate, and the color tone of the polyester resin thus obtained must be improved. Moreover, use of a complex of a titanium compound and a phosphorus compound as a catalyst for the production of a polyester has been proposed (see, e.g., Reference Patent 3). Although the melt heat stability is improved to a certain degree when the method is employed, the effect is not sufficient, and the color tone of the polyester thus obtained must be improved.

The cited references mentioned above are described below.

[Reference Patent 1]
Japanese Examined Patent Publication (Kokoku) No. 59-462658
[Reference Patent 2]
Japanese Unexamined Patent Publication (Kokai) No. 58-38722
[Reference Patent 3]
Japanese Unexamined Patent Publication (Kokai) No. 7-138354

DISCLOSURE OF THE INVENTION

An object of the present invention is to provide a nonwoven fabric containing composite fibers that are produced from a polyester polymer of high quality having a good color tone (high L value and low b value) and a heat-adhesive polymer, and having highly uniform quality.

The polyester-composite-staple-fiber nonwoven fabric of the present invention is a nonwoven fabric comprising heat-adhesive composite staple fibers comprising a hot melt-adhesive polymer and a fiber-forming thermoplastic polymer, wherein:

the hot melt-adhesive polymer forms a portion of the periphery of each composite staple fiber extending along the longitudinal direction of the composite staple fiber, and the fiber-forming thermoplastic polymer forms the remaining portion of each composite staple fiber;

the fiber-forming thermoplastic polymer is selected from polyester polymers produced by polycondensing aromatic dicarboxylate esters in the presence of a catalyst;

the catalyst comprises at least one member selected from mixtures (1) and reaction products (2) as specified below;

the mixture (1) for the catalyst comprises:

(A) titanium compound component comprising at least one member selected from the group consisting of:

(a) titanium alkoxides represented by the general formula (I):

in which formula (I), $R^1$, $R^2$, $R^3$ and $R^4$ respectively, and independently from each other, represent a member selected from alkyl groups having 1 to 20 carbon atoms and a phenyl group, m represents an integer of 1 to 4, and when m represents an integer of 2, 3 or 4, the 2, 3 or 4 $R^2$s and $R^3$s may, respectively, be the same as each other or be different from each other, and (b) reaction products of the titanium alkoxides of the general formula (I) with aromatic polycarboxylic acids represented by the formula (II):

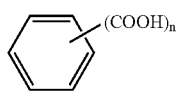

(II)

in which formula (II), n represents an integer of 2 to 4, or anhydrides of the acids of the formula (II), and (B) phosphorus compound component comprising at least one phosphorus compound represented by the general formula (III):

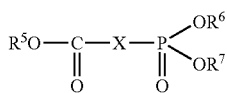

(III)

in which formula (III), $R^5$, $R^6$ and $R^7$ respectively and independently from each other represent an alkyl group having 1 to 4 carbon atoms, and X represents a member selected from a —$CH_2$— group and a —CH(Y)-group (wherein Y represents a phenyl group), the mixture (1) for the catalyst for the polycondensation being employed in an amount satisfying the requirements represented by the following expressions of relation (i) and (ii):

$$1 \leq M_P/M_{Ti} \leq 15 \quad \text{(i)}$$

and $$10 \leq M_P + M_{Ti} \leq 100 \quad \text{(ii)}$$

wherein $M_{Ti}$ represents a ratio in % of a value in millimole of titanium element contained in the titanium compound component (A) to a value in mole of the aromatic dicarboxylate ester, and $M_P$ represents a ratio in % of a value in millimole of phosphorus element contained in the phosphorus compound component (B) to the value in mole of the aromatic dicarboxylate ester; and the reaction products (2) for the catalyst comprise: a component (C) reacted with a component (D), in which reaction products (2), the component (C) comprises at least one member selected from the group consisting of (c) titanium alkoxides represented by the general formula (IV):

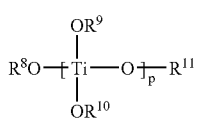

(IV)

in which formula (IV), $R^8$, $R^9$, $R^{10}$ and $R^{11}$ respectively, and independently from each other, represent an alkyl group having 1 to 20 carbon atoms, p represents an integer of 1 to 3, and when p represents an integer of 2 or 3, 2 or 3 $R^9$s and $R^{10}$s may, respectively, be the same as each other or different from each other, and (d) reaction products of the titanium alkoxides of the general formula (IV) with aromatic polycarboxylic acids represented by the above-mentioned general formula (II) or anhydride of the acids, and the component (D) comprises at least one phosphorus compound represented by the general formula (V):

(V)

in which formula (V), $R^{12}$ represents an alkyl group having 1 to 20 carbon atoms or an aryl group having 6 to 20 carbon atoms, and q represents an integer of 1 or 2.

For the polyester-composite-staple-fiber nonwoven fabric of the present invention, in each of the component (A) of the mixture (1) and the component (C) of the reaction products (2) for the catalyst, a reaction molar ratio of each of titanium alkoxides (a) and (c) to the aromatic polycarboxylic acid of the general formula (II) or the anhydride thereof is preferably in the range of from 2:1 to 2:5.

For the polyester composite staple fiber nonwoven fabric of the present invention, in the reaction product (2) for the catalyst, a reaction amount ratio of the component (D) to the component C is preferably in the range of, in terms of the ratio (P/Ti) of the molar amount of phosphorus atoms contained in the component (D) to the molar amount of titanium atoms contained in the component (C), from 1:1 to 3:1.

For the polyester composite staple fiber nonwoven fabric of the present invention, the phosphorus compound of the general formula (V) for the reaction product (2) is preferably selected from monoalkyl phosphates.

For the polyester composite staple fiber nonwoven fabric of the present invention, the dialkyl aromatic dicarboxylate ester is preferably one produced by a transesterification reaction, of a dialkyl ester of an aromatic dicarboxylic acid, with an alkylene glycol.

For the polyester composite staple fiber nonwoven fabric of the present invention, the aromatic dicarboxylic acid is preferably selected from terephthalic acid, 1,2-naphthalenedicarboxylic acid, phthalic acid, isophthalic acid, diphenyldicarboxylic acid and diphenoxyethanedicarboxylic acid, and the alkylene glycol is preferably selected from ethylene glycol, butylene glycol, trimethylene glycol, propylene glycol, neopentyl glycol, hexamethylene glycol and dodecamethylene glycol.

For the polyester composite staple fiber nonwoven fabric of the present invention, the polyester polymer preferably has an L* value of 77 to 85 and a b* value of 2 to 5, determined in accordance with the L*a*b* color specification of JIS Z 8729.

For the polyester composite staple fiber nonwoven fabric of the present invention, the composite staple fibers may be made to have a side-by-side type structure.

For the polyester composite staple fiber nonwoven fabric as claimed of the present invention, the composite staple fibers may be made to have a concentric or eccentric core-in-sheath type structure, the concentric or eccentric core portions of the composite staple fibers may be made to comprise the fiber-forming thermoplastic polymer, and the concentric or eccentric sheath portions of the composite staple fibers may be made to comprise the hot melt-adhesive polymer.

For the polyester composite staple fiber nonwoven fabric of the present invention, the mass ratio of the hot melt-adhesive polymer to the fiber-forming thermoplastic polymer is preferably in the range of from 30:70 to 70:30.

For the polyester composite staple fiber nonwoven fabric of the present invention, the hot melt-adhesive polymer is preferably selected from polyurethane elastomers, polyester elastomers, non-elastic polyester homopolymers and copolymers, polyolefin homopolymers and copolymers, and polyvinyl alcohol polymers.

For the polyester composite staple fiber nonwoven fabric of the present invention, the polyester composite staple fibers preferably have an individual fiber thickness of 0.01 to 10 dtex and a fiber length of 5 to 100 mm.

For the polyester composite staple fiber nonwoven fabric of the present invention, the nonwoven fabric is preferably one produced from the polyester composite staple fibers by a carding method, a paper-forming method or an air-laid method and is then heat treated.

For the polyester composite staple fiber nonwoven fabric of the present invention, the nonwoven fabric is one that may be subjected to a fiber-interlacing procedure before the heat treatment.

For the polyester composite staple fiber nonwoven fabric of the present invention, the polyester composite staple fibers are preferably contained in the nonwoven fabric in a content of 25 to 100% by mass on the basis of the nonwoven fabric.

For the polyester composite staple fiber nonwoven fabric of the present invention, the polyester composite staple fiber nonwoven fabric is preferably employed in a use in which the nonwoven fabric is brought into contact with food.

BEST MODE FOR CARRYING OUT THE INVENTION

The polyester composite staple fiber nonwoven fabric of the present invention is a nonwoven fabric that comprises heat-adhesive composite staple fibers comprising a hot melt-adhesive polymer and a fiber-forming thermoplastic polymer.

The hot melt-adhesive polymer forms a portion of the periphery of each composite staple fiber extending along the longitudinal direction of the composite staple fiber, and the fiber-forming thermoplastic polymer forms the remaining portion of each composite staple fiber.

The fiber-forming thermoplastic polymer is selected from polyester polymers produced by polycondensing an aromatic dicarboxylate ester in the presence of a catalyst.

A catalyst for producing the polyester polymer comprises at least one member selected from mixtures (1) and reaction products (2). The mixture (1) for the catalyst is a mixture of titanium compound component (A) and phosphorus compound component (B) described below. The reaction products (2) are reaction products of titanium compound component (C) and phosphorus compound component (D) described below.

The titanium compound component (A) for the mixture (1) for the catalyst comprises at least one member selected from the group consisting of:

(a) titanium alkoxides represented by the general formula (I):

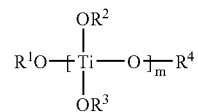

in which formula (I), $R^1$, $R^2$, $R^3$ and $R^4$ respectively and independently from each other represent a member selected from alkyl groups having 1 to 20 carbon atoms, preferably 1 to 6 carbon atoms and a phenyl group, m represents an integer of 1 to 4, preferably 2 to 4, and when m represents an integer of 2, 3 or 4, the 2, 3 or 4 $R^2$s and $R^3$s may be respectively the same as each other or different from each other, and (b) reaction products of the titanium alkoxides of the general formula (I) with aromatic polycarboxylic acids represented by the formula (II):

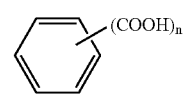

in which formula (II), n represents an integer of 2 to 4, preferably 3 to 4, or anhydrides of the acids.

Furthermore, the phosphorus compound component (B) of the mixture (1) for the polycondensation catalyst comprises at least one phosphorus compound represented by the general formula (III):

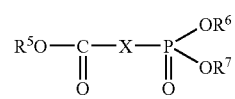

in which formula (III), $R^5$, $R^6$ and $R^7$ respectively and independently from each other represent an alkyl group having 1 to 4 carbon atoms, and X represents a member selected from a —$CH_2$— group and a —CH(Y)-group (wherein Y represents a phenyl group).

Furthermore, the titanium compound component (C) of the reaction products (2) for the polycondensation catalyst comprises at least one member selected from the group consisting of (c) titanium alkoxides represented by the general formula (IV):

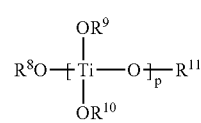

in which formula (IV), $R^8$, $R^9$, $R^{10}$ and $R^{11}$ respectively and independently from each other represent an alkyl group having 1 to 20 carbon atoms, preferably 1 to 6 carbon atoms, p represents an integer of 1 to 3, preferably 1 or 2, and when p represents an integer of 2 or 3, 2 or 3 $R^9$s and $R^{10}$s may be respectively the same as each other or different from each other, and (d) reaction products of the titanium alkoxides of the general formula (IV) with aromatic polycarboxylic acids represented by the above-mentioned general formula (II) or anhydride of the acids.

The phosphorus compound component (D) of the reaction products (2) for the polycondensation catalyst comprises at least one phosphorus compound represented by the general formula (V):

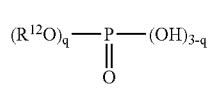

in which formula (V), $R^{12}$ represents an alkyl group having 1 to 20 carbon atoms or an aryl group having 6 to 20 carbon atoms, and q represents an integer of 1 or 2.

When the mixture (1) of the titanium compound component (A) and the phosphorus compound component (B) mentioned above is used as the polycondensation catalyst, the titanium alkoxides (a) of the general formula (I) used as the titanium compound component (A), and the reaction products (b) of the titanium alkoxides (a) with the aromatic polycarboxylic acids of the general formula (II) or anhydrides thereof have high compatibility or affinity for the polyester polymers. Accordingly, even when the titanium compound component (A) remains in the polyester polymer obtained by polycondensation, no foreign matter deposit is formed around the periphery of the spinneret during melt spinning. As a result, polyester filaments having good quality can be produced with high spinning efficiency.

Preferred examples of the titanium alkoxides (a) of the general formula (I) used for the titanium compound component (A) for the polycondensation catalyst used in the present invention include tetraisopropoxytitanium, tetrapropoxytitanium, tetra-n-butoxytitanium, tetraethoxytitanium, tetraphenoxytitanium, octaalkyl trititanate and hexaalkyl dititanate.

Preferred examples of the titanium alkoxides (c) of the general formula (IV) used for the titanium compound component (C) for the polycondensation catalyst used in the present invention include titanium tetralkoxides such as titanium tetrabutoxide, titanium tetraisopropoxide, titanium tetrapropoxide and titanium tetraethoxide, and alkyl titanates such as octaalkyl trititanate and hexaalkyl dititanate. In particular, titanium tetrabutoxide that is highly reactive with a phosphorus component is preferably used.

Furthermore, the aromatic polycarboxylic acids represented by the general formula (II) and the anhydrides thereof to be reacted with the titanium alkoxides (a) or (c) are preferably selected from phthalic acid, trimellitic acid, hemimellitic acid, pyromellitic acid and acid anhydrides of these acids. In particular, when trimellitic anhydride is used, the reaction products (b) thus obtained show high affinity for the polyester polymer, and are effective in preventing deposition of foreign matter.

When the titanium alkoxide (a) or (c) is to be reacted with the aromatic polycarboxylic acid of the general formula (II), for example, the aromatic polycarboxylic acid or the anhydride thereof is dissolved in a solvent; the titanium alkoxide (a) or (c) is dropped into the solution, and the mixture solution is preferably heated at temperature from 0 to 200° C. for at least 30 minutes. In addition, the solvent is preferably selected, in response to the requirements, from ethanol, ethylene glycol, trimethylene glycol, tetramethylene glycol, benzene, xylene, etc.

There is no specific limitation on the reaction molar ratio of the titanium alkoxide (a) or (c) to the aromatic polycarboxylic acid of the general formula (II) or the anhydride thereof. However, when the proportion of the titanium alkoxide is too high, the color tone of the polyester thus obtained is sometimes deteriorated or the softening point is sometimes lowered. Conversely, when the proportion of the titanium alkoxide is too low, the polycondensation reaction sometimes hardly proceeds. Accordingly, the reaction molar ratio of the titanium alkoxide (a) or (c) to the aromatic polycarboxylic acid of the general formula (II) or the anhydride thereof is preferably in the range from (2:1) to (2:5).

The reaction products (b) or (d) thus obtained by the reaction may be used without further processing, or they may be purified by recrystallizing from acetone, methyl alcohol and/or ethyl acetate, and then used.

The phosphorus compound (phosphonate compound) of the general formula (III) usable for the phosphorus compound component (B) of the mixture (1) for the polycondensation catalyst is preferably selected from esters of phosphonic acid derivatives, for example, dimethyl esters, diethyl esters, dipropyl esters and dibutyl esters of phosphonic acid derivatives, for example, carbomethoxymethanephosphonic acid, carboethoxymethanephosphonic acid, carbopropoxymethanephosphonic acid, carbobutoxymethanephosphonic acid, carbomethoxyphenylmethanephosphonic acid, carboethoxyphenylmethanephosphonic acid, carbopropoxyphenylmethanephosphonic acid, carbobutoxyphenylmethanephosphonic acid, etc.

The phosphorus compound component (B) comprising a phosphorus compound (phosphonate compound) of the general formula (III), when used for the polycondensation reaction of aromatic dicarboxylate esters, relatively slowly reacts with the titanium compound component (A) in comparison with a phosphorus compound used as a conventional reaction stabilizer. The catalyst activity duration time of the titanium compound component (A) is therefore long between polycondensation reaction steps. As a result, the ratio of an amount of the titanium compound component (A) used to an amount of the aromatic dicarboxylate esters in the polycondensation reaction system can be decreased. Moreover, addition of a large amount of a stabilizer to the polycondensation reaction system containing the phosphorus compound component (B) comprising a phosphorus compound of the general formula (III) neither lowers the thermal stability of the polyester polymer thus obtained nor deteriorates the color tone thereof.

When the mixture (1) is used as a polycondensation catalyst in the present invention, the mixture (1) is employed in an amount satisfying the requirements represented by the following expressions of relation (i) and (ii):

$$1 \leq M_p/M_{Ti} \leq 15 \quad \text{(i)}$$

and $$10 \leq M_p + M_{Ti} \leq 100 \quad \text{(ii)}$$

wherein $M_{Ti}$ represents a ratio in % of a value in millimole of titanium element contained in the titanium compound component (A) to a value in mole of the aromatic dicarboxylate ester, and $M_p$ represents a ratio in % of a value in millimole of phosphorus element contained in the phosphorus compound component (B) to the value in mole of the aromatic dicarboxylate ester.

The ratio $M_p/M_{Ti}$ is from at least 1 to 15, and preferably from at least 2 to 10. When the ratio $M_p/M_{Ti}$ is less than 1, a yellow shade is sometimes imparted to the polyester polymer thus obtained. When the ratio exceeds 15, the polycondensation, reactivity, caused by the resultant polycondensation catalyst, becomes insufficient, and a desired polyester polymer is hardly obtained. Although the range of the ratio $M_p/M_{Ti}$ used in the present invention is relatively narrow in comparison with that of the conventional Ti—P system catalyst, determination of the ratio in the above range makes it possible to obtain excellent effects that cannot be obtained when the conventional Ti—P system catalyst is used.

Furthermore, the sum $(M_{Ti}+M_p)$ is in the range of from 10 to 100, preferably from 20 to 70. When the sum $(M_{Ti}+M_p)$ is less than 10, the results are as follows: the fiber-forming properties of the polyester polymer thus obtained become insufficient; the production efficiency during the melt-spinning step becomes inadequate; and the properties of the fibers thus obtained become unsatisfactory. Moreover, when the sum $(M_{Ti}+M_p)$ exceeds 100, foreign matter deposits in a small amount around the periphery of the spinneret during melt spinning the polyester polymer. In general, the value of $M_{Ti}$ is preferably from 2 to 15, and more preferably from 3 to 10.

When the reaction products (2) are used as the polycondensation catalyst in the present invention, examples of the phosphorus compound of the general formula (V) used for the phosphorus compound component (D) include monoalkyl phosphates, for example, mono-n-butyl phosphate, monohexyl phosphate, monododecyl phosphate, monolauryl phosphate and monooleyl phosphate; monoaryl phosphates, for example, monophenyl phosphate, monobenzyl phosphate, mono(4-ethylphenyl) phosphate, monobiphenyl phosphate, mononaphthyl phosphate and monoanthryl phosphate; dialkyl phosphates, for example, diethyl phosphate, dipropyl phosphate, dibutyl phosphate, dilauryl phosphate and dioleyl phosphate; and diaryl phosphates, for example, diphenyl phosphate. Among these compounds, a monoalkyl phosphate or a monoaryl phoshphate of the formula (V), in which q represent the integer one, is preferably used.

The phosphorus compound component (D) used in the present invention may also be a mixture of at least two types of the phosphorus compounds of the general formula (V). Preferred examples of the combination include a mixture of a monoalkyl phosphate and a dialkyl phosphate and a mixture of monophenyl phosphate and diphenyl phosphate. Of the mixtures, a composition containing at least 50%, specifically at least 90% of a monoalkyl phosphate based on the total mass of the mixture is particularly preferred.

The reaction products of the titanium compound component (C) and the phosphorus compound component (D) can be prepared by, for example, mixing both components (C) and (D) and heating the mixture in a glycol. That is, when a glycol solution containing the titanium compound (C) and the phosphorus compound component (D) is heated, the glycol solution becomes cloudy and precipitates the reaction products of both components (C) and (D) as precipitates. The precipitates are collected, and may be used as a catalyst for the production of polyester polymers.

As a glycol that can be used in the production of the reaction products (2) for the catalyst, the same glycol component as one forming the polyester polymer that is produced with the catalyst thus obtained is preferably used. For example, when the polyester polymer is a polyethylene terephthalate, ethylene glycol is preferably used. When the polyester polymer is a polytrimethylene terephthalate, 1,3-propanediol is preferably used. When the polyester polymer is a polytetramethylene terephthalate, tetramethylene glycol is preferably used.

In addition, the reaction products (2) for the polycondensation catalyst of the present invention can also be produced by simultaneously mixing the titanium compound component (C), the phosphorus compound component (D) and the glycol and heating the mixture. However, because the titanium compound component (C) and the phosphorus compound component (D) are reacted with each other by heating to precipitate reaction products insoluble in the glycol, conducting the reaction homogeneously, until the precipitation takes place, is preferred. Accordingly, in order to obtain reaction precipitates efficiently, the following procedure is preferred: two glycol solutions containing the titanium compound component (C) and the phosphorus compound component (D), respectively, are prepared in advance; and the two solutions are then mixed, followed by heating the mixture.

Moreover, the components (C) and (D) are preferably reacted at temperature from 50 to 200° C. The reaction time is preferably from 1 minute to 4 hours. When the reaction temperature is too low, the reaction becomes inadequate, or the reaction takes too long and, as a result, the reaction precipitates sometimes cannot be obtained efficiently by a homogeneous reaction.

The mixing proportion of the titanium compound component (C) and the phosphorus compound component (D) to be heated and reacted in glycol is as follows. The molar ratio of the phosphorus atoms to the titanium atoms is preferably from 1.0 to 3.0, and more preferably from 1.5 to 2.5 based on the titanium atoms. When the molar ratio is in the above-mentioned range, the phosphorus compound component (D) and the titanium compound component (C) are substantially completely reacted with each other, and incomplete reaction products do not exist. As a result, even when the reaction products are used without further processing, the color tone of the polyester polymer thus obtained is good. Moreover, because substantially no excess unreacted phosphorus compound (V) exists, the polyester polymerization reactivity is not inhibited, and the productivity becomes high.

The reaction products (2) for the polycondensation catalyst used in the present invention are preferably made to contain a compound represented by the general formula (VI):

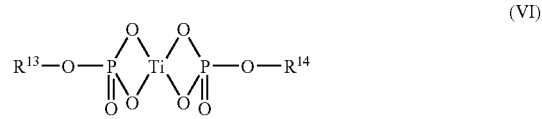

(VI)

wherein $R^{13}$ and $R^{14}$, respectively and independently from each other, represent one type selected from (i) an alkyl group originating from $R^8$, $R^9$, $R^{10}$ and $R^{11}$ in the general formula (IV) representing the titanium alkoxide for the titanium compound component (C) and $R^{12}$ in the general formula (V) representing the phosphorus compound for the phosphorus compound component (D) and having 1 to 10 carbon atoms, or (ii) an aryl group originating from $R^{12}$ of the phosphorus compound (V) and having 6 to 12 carbon atoms.

The reaction products of a titanium compound represented by the formula (VI) and a phosphorus compound (V) have high catalyst activity. Moreover, a polyester polymer obtained using the reaction products has a good color tone (low b value); the contents of acetaldehyde, residual metal and cyclic trimers are sufficiently low for practical use, and the polymer has practically satisfactory polymer properties. In addition, it is preferred that the polycondensation catalyst contains at least 50% by mass, more preferably at least 70% by mass of the reaction products represented by the formula (VI).

While polycondensing an aromatic dicarboxylate ester in the presence of the reaction products (2), it is not necessary to separate the precipitated reaction products (2) and the glycol from the glycol solution containing the precipitated reaction products (2) obtained as explained above. The glycol solution can be used as a catalyst for the production of the polyester polymer without further processing. Furthermore, the following procedure may also be employed: precipitates are separated from the glycol solution containing the precipitation reaction products (2) by means such as centrifugal precipitation or filtering; the precipitation reaction products (2) are then recrystallized from a recrystallizing agent such as acetone, methyl alcohol and/or water, and the purified products are used as the polycondensation catalyst. In addition, the chemical structure of the reaction products (2) for the polycondensation catalyst can be confirmed by quantative analysis of metal with solid NMR and XMA.

The polyester polymer usable for the present invention is produced by polycondensing aromatic dicarboxylate esters in the presence of a catalyst containing a mixture (1) of the titanium compound component (A) and the phosphorus compound (phosphonate compound) (B) and/or the reaction products (2) of the titanium compound component (C) and the phosphorus compound component (D). In the present invention, the aromatic dicarboxylate esters are preferably diesters comprising an aromatic dicarboxylic acid component and a fatty group glycol component.

Herein, terephthalic acid is preferably the major component of the aromatic dicarboxylic acid component. More specifically, the content of terephthalic acid is preferably at least 70% by mole based on the aromatic dicarboxylic acid component. Examples of a preferred aromatic dicarboxylic acid other than terephthalic acid include phthalic acid, isophthalic acid, naphthalenedicarboxylic acid, diphenyldicarboxylic acid and diphenoxyethanedicarboxylic acid.

Furthermore, the fatty glycol component is preferably composed of alkylene glycol. Examples of the alkylene glycol include ethylene glycol, trimethylene glycol, propylene glycol, tetramethylene glycol, neopentyl glycol, hexamethylene glycol and dodecamethylene glycol. Of these compounds, ethylene glycol is particularly preferred.

In the present invention, the polyester polymer is preferably one containing ethylene terephthalate, formed out of terephthalic acid and ethylene glycol, as a major repeating unit. Herein, the content of the ethylene terephthalate repeating unit is preferably at least 70% by mole based on the entire amount of the repeating units in the polyester.

Furthermore, the polyester polymer used in the present invention may also be a copolymerized polyester obtained by copolymerizing a component that forms the polyester as an acid or diol component.

A bifunctional carboxylic acid component, for example, fatty dicarboxylic acids such as adipic acid, sebacic acid, azelaic acid and decanedicarboxylic acid and alicyclic dicarboxylic acids such as cyclohexanedicarboxlic acid as well as the above aromatic dicarboxylic acids, or the ester-forming derivatives of the bifunctional carboxylic acid component can be used as the starting materials of the copolymerization carboxylic acid component. Moreover, the following compounds can be used as the starting materials (copolymerization diol component): alicyclic glycols such as cyclohexanedimethanol, and aromatic diols such as bisphenol, hydroquinone and 2,2-bis(4-β-hydroxyethoxyphenyl)propane as well as fatty diols.

Furthermore, a copolymerized polyester polymer, obtained by copolymerizing, as a copolymerization component, a polyfunctional compound such as trimesic acid, trimethylolethane, trimethylolpropane, trimethylolmethane and pentaerythritol, can be used.

One type of the above polyester polymers and copolymerized polyester polymers may be used alone. Alternatively, at least two types thereof may be used in combination.

In the present invention, polycondensation products of an aromatic dicarboxylate ester formed out of the aromatic dicarboxylic acid and the fatty glycol as described above are preferably used as the polyester polymer. The aromatic dicarboxylate ester can be produced by the diesterification reaction of an aromatic dicarboxylic acid and a fatty glycol. Alternatively, the ester can also be produced by the transesterification reaction of a dialkyl ester of an aromatic dicarboxylic acid and a fatty glycol. However, the transesterification method with the dialkyl ester of an aromatic dicarboxylic acid used as a raw material has the following advantage over the diesterification method with an aromatic acid used as a raw material: a phosphorus compound added as a phosphorus stabilizing agent during the polycondensation reaction is less scattered.

Furthermore, the following procedure is preferred: part of, or the entire amount of, the titanium compound component (A) or (C) is added, prior to the start of the transesterification reaction, to the reaction system and the added amount of component is used as a catalyst for the two reactions, the transesterification reaction and the polycondensation reaction. When the procedure is carried out, the content of the titanium compound in the polyester can be finally decreased. A polyethylene terephthalate is taken as an example, and the procedure is more specifically explained below. The transesterification reaction between dialkyl esters of aromatic dicarboxylic acids containing terephthalic acid as the major component and ethylene glycol is preferably conducted in the presence of the titanium compound component (A) comprising at least one member selected from the group consisting of titanium alkoxides (a) represented by the above general formula (I) and reaction products (b) of the titanium alkoxides of the general formula (I) with aromatic polycarboxylic acids represented by the above general formula (II) or the anhydrides thereof. The phosphorus compound (phosphonate compound) component (B) represented by the general formula (III) or the reaction products of the titanium compound component (C) and the phosphorus compound component (D) are added to the reaction mixture obtained by the transesterification reaction and containing diesters of the aromatic dicarboxylic acids and ethylene glycol, and the polycondensation is allowed to proceed in the presence of these substances.

In addition, when the transesterification reaction is to be conducted, the reaction is usually conducted under ambient atmospheric pressure. However, when the reaction is conducted under pressure from 0.05 to 0.20 MPa, a reaction caused by the catalytic action of the titanium compound component (A) is further promoted, and the byproduct diethylene glycol is not produced in a large amount. The polyester polymer thus obtained therefore has still more excellent properties such as thermal stability. The transesterification temperature is preferably from 160 to 260° C.

Moreover, when the aromatic dicarboxylic acid is terephthalic acid in the present invention, terephthalic acid and dimethyl terephthalate are used as the starting materials of the polyester. In such a case, recovered dimethyl terephthalate obtained by depolymerizing polyalkylene terephthalate or recovered terephthalic acid obtained by hydrolyzing the recovered terephthalate can also be used. In such a case, use of recycled polyester obtained from recovered PET bottles, fiber products, polyester film products, and the like is particularly preferred in view of effective utilization of resources.

The polycondensation reaction may be conducted in a single reaction vessel, or it may be conducted successively in a plurality of reaction vessels. The polyester thus obtained in the polycondensation step is usually linearly extruded in a molten state, and cooled. The cooled polyester is then formed (cut) to a particle (chip) form.

The polyester polymer thus obtained in the above polycondensation step can be further subjected to solid phase polycondensation, if desired.

The solid phase polycondensation step includes at least one stage, and is conducted in an atmosphere of an inert gas such as a nitrogen, argon or carbon dioxide gas at temperature from 190 to 230° C. and pressure from 1 kPa to 200 kPa.

The particles of polyester produced through such a solid phase polycondensation step may also be optionally treated with water by contacting the polyester with water, steam, a steam-containing inert gas, steam-containing air or the like, whereby the catalyst contained in the chips is deactivated.

The production of the polyester including the esterification step and the polycondensation step as explained above can be conducted by any one of the batch type, semi-continuous type or continuous type process.

The intrinsic viscosity of the polyester polymer thus obtained and used in the present invention is preferably from 0.40 to 0.80, more preferably from 0.45 to 0.75, and particularly preferably from 0.50 to 0.70. When the intrinsic viscosity is less than 0.40, the strength of the polyester fiber thus obtained sometimes becomes inadequate. Moreover, when the intrinsic viscosity exceeds 0.80, the intrinsic viscosity of the raw material polymer must be excessively increased. The intrinsic viscosity is therefore uneconomical.

The polyester polymer used in the present invention may optionally be made to contain small amounts of additives such as antioxidants, Uv-ray absorbers, flame retardants, fluorescent brighteners, delustering agents, orthochromatic agents, defoaming agents, antistatic agents, antibacterial agents, light stabilizing agents, heat stabilizing agents and light shielding agents. Addition of titanium dioxide as a delustering agent and an antioxidant as a stabilizing agent is particularly preferred. The titanium dioxide has an average particle size of preferably from 0.01 to 2 μm, and is contained in the polyester polymer in a content of preferably from 0.01 to 10% by mass.

In addition, the content of titanium derived from the catalyst contained in the polyester polymer should not include titanium derived from titanium dioxide added as a delustering agent.

When titanium dioxide is contained in the polyester polymer as a delustering agent, the delustering agent titanium dioxide alone is removed from a polyester polymer sample for measurement by the following procedure: the polyester polymer sample is dissolved in hexafluoroisopropanol; the solution is subjected to centrifugal separation so that titanium dioxide particles are separated from and settled in the solution; the supernatant is separated and recovered by decantation; the solvent is removed from the recovered fraction by evaporation to give a sample to be tested.

A hindered phenol type antioxidant is preferably used as the antioxidant. The addition amount of the antioxidant is preferably up to 1% by mass, and more preferably from 0.005 to 0.5% by mass. When the addition amount exceeds 1% by mass, the addition effect is saturated, and the addition sometimes causes scum formation during melt spinning. Moreover, the hindered phenol type antioxidant may also be used in combination with a thioether type secondary antioxidant.

There is no specific limitation on the method of adding the antioxidant to the polyester. It can be added at any arbitrary stage between the start of the transesterification reaction and the completion of the polycondensation reaction.

The polyester polymer used in the represent invention has a good color tone (L* value and b*value) due to the catalyst used. That is, the polyester polymer preferably has an L* value of 77 to 85 and a b* value of 2 to 5, determined in accordance with the L*a*b* color specification of JIS Z 8729.

For the heat-adhesive composite staple fibers forming the nonwoven fabric of the invention, the polyester polymer is used as the fiber-forming thermoplastic polymer component, and a hot melt-adhesive polymer component is used in combination.

In the heat-adhesive composite staple fibers, the hot melt-adhesive polymer component forms a portion of the periphery of each composite staple fiber extending along the longitudinal direction of the composite staple fiber, and the polyester polymer forms the remaining portion of each composite staple fiber. That is, the heat-adhesive polymer forms at least a portion of the periphery of each composite staple fiber in the heat-adhesive composite staple fibers used in the present invention, and the portion of the periphery continuously extends along the longitudinal direction of the staple fiber. That is, the hot melt-adhesive polymer component in the composite staple fibers of the nonwoven fabric bonds the composite staple fibers at the intersecting points of the fibers.

For the polyester composite staple fibers used in the present invention, the content mass ratio of the heat-adhesive polymer component to the polyester polymer component is in the range of from 30:70 to 70:30, and more preferably from 40:60 to 60:40.

For the composite staple fibers used in the present invention, the hot melt-adhesive polymer component and the polyester polymer component may be composited in a side-by-side type structure, or in a concentric or eccentric core-in-sheath type structure. When the composite staple fibers have a concentric or eccentric core-in-sheath type structure, the core portion is generally formed out of a polyester polymer, and the sheath portion is formed out of a hot melt-adhesive polymer. In the eccentric core-in-sheath structure, the eccentric core portion may optionally be formed out of a hot melt-adhesive polymer, part of which is exposed outside in part of the portion of the periphery of the staple fibers. The eccentric core-in-sheath portion may also be formed out of the polyester polymer. In the side-by-side type staple fibers and eccentric core-in-sheath type staple fibers, a spiral crimp is manifested in the fibers due to a difference in thermal shrinkage between the portions formed out of the hot melt-adhesive polymer and the portions formed out of the polyester polymer. The staple fibers are therefore preferred as nonwoven fabric-forming staple fibers. There is no limitation on the cross-sectional shape of the composite staple fibers. The shape may be a conventional round shape, or other modified shapes such as a triangular shape, a polygonal shape or a flattened shape. The cross-sectional shape of these shapes may also be hollow or non-hollow (solid).

The hot melt-adhesive polymer employed for the composite staple fibers used in the present invention preferably contains at least one type of materials such as a polyurethane elastomer, a polyester elastomer, a non-elastic polyester polymer and a copolymer of the polymer, a polyolefin polymer and a copolymer of the polymer, and a polyvinyl alcohol polymer. Of these substances, the polyester elastomer or non-elastic polyester polymer or its copolymer is particularly preferably used. These substances preferably have a melting point as low as from 50 to 200° C. due to the melting point of the polyester polymer, and the melting point is preferably from 50 to 200° C.

A copolymerized ester prepared in the following manner is used as the copolymerized polyester polymer: copolymerization esterification of a plurality of compounds selected from (1) fatty dicarboxylic acids such as adipic acid and sebacic acid, (2) aromatic dicarboxylic acids such as phthalic acid, isophthalic acid and naphthalenedicarboxylic acid, and/or (3) alicyclic dicarboxylic acids such as hexahydroterephthalic acid and hexahydroisophthalic acid and (4) fatty or alicyclic diols, with oxy acids such as p-hydroxybenzoic acid being optionally added. For example, it is preferred to use a polyester prepared by, for example, adding isophthalic acid and 1,6-hexanediol to a combination of terephthalic acid and ethylene glycol, and copolymerizing the mixture.

Furthermore, examples of the polyolefin polymer include a low-density polyethylene, a high-density polyethylene and polypropylene.

The polyester polymer contained in the composite staple fibers is preferably selected from polyethylene terephthalate, polypropylene terephthalate, polybutylene terephthalate, polytrimethylene terephthalate, and the like.

The polyester polymer may be composed of a single type, or it may be a mixture of at least two types of polyester polymers. Alternatively, it may also be a mixture of the polyester polymer component and a different type of polymer component that is optionally mixed to such an extent that the properties of the polyester polymer are not impaired. The different type of polymer component can be selected from copolymerizable components such as the above fatty dicarboxylic acids.

In order to produce the heat-adhesive composite staple fibers used in the present invention, any one of the conventional composite staple fiber-forming methods and production methods of the fibers may be employed.

When staple fibers are produced by cutting the heat-adhesive composite polyester fibers, the cut length is preferably from 5 to 100 mm, and particularly preferably from 15 to 95 mm. The composite staple fibers having a fiber length in the above range are particularly excellent in cardability and nonwoven fabric-formability.

The nonwoven fabric of the present invention can be produced by the following procedures: staple fibers having a relatively long fiber length are formed into a sheet-like staple fiber bulk material by a dry method (card method) in which the staple fibers are open and mixed with a roller equipped with a card clothing, a wet method (paper-forming method) in which staple fibers having a relatively short fiber length are dispersed in water and formed into a paper sheet on a wire net, an air laid method (also termed an air lay method or a dry pulp method sometimes) in which staple fibers having a relatively short fiber length are supplied to a perforated drum and dispersed by air to form a web, etc., and the bulk material is interlaced and heat treated to form a fixed structure.

The basis mass of the nonwoven fabric of the present invention is preferably from 10 to 500 g/m$^2$, and more preferably from 20 to 300 g/m$^2$. When the basis mass is less than 10 g/m$^2$, continuous production of a uniform web becomes extremely difficult sometimes. When the basis mass exceeds 500 g/m$^2$, the web becomes highly stiff as a nonwoven fabric, and sometimes becomes unsuitable for practical use.

The nonwoven fabric of the present invention may optionally be made to contain staple fibers different from the heat-adhesive composite staple fibers. In such a case, there is no specific limitation on the content of the heat-adhesive composite staple fibers contained in the nonwoven fabric of the invention. However, in order for the nonwoven fabric to exhibit excellent properties and effects, the mass proportion is preferably at least 25%, more preferably at least 50%.

Examples of the different fibers that may be contained in the nonwoven fabric of the invention include fibers adapted to a conventional dry type nonwoven fabric such as natural fibers (e.g., cotton), regenerated fibers (e.g., rayon), semi-synthetic fibers (e.g., acetate), synthetic fibers (e.g., PVA fibers, polyolefin fibers, nylon fibers, aramid fibers and acrylic fibers), inorganic fibers (e.g., carbon fibers), and composite fibers formed out of a plurality of polymers each having a melting point different from the others.

For the nonwoven fabric of the present invention, the constituent staple fibers are fixed by interlacing fibers with needles (needle punch method), interlacing fibers with a high pressure water stream (spun lace method), bonding with binder fibers (air through method), interlacing by shrinkage, and pressing with a hot roll.

The thickness of the heat-adhesive composite staple fibers contained in the nonwoven fabric of the invention is preferably from 0.01 to 10 dtex, and more preferably from 0, 1 to 7 dtex. When the thickness is less than 0.01 dtex, the openability is poor. As a result, the production line speed decreases, and the productivity sometimes becomes inadequate. When the thickness exceeds 10 dtex, a uniform web is sometimes hard to obtain, and/or the web sometimes becomes too stiff.

The composite staple fibers used for the nonwoven fabric of the present invention may or may not be crimped. In general, in order to obtain a bulky nonwoven fabric, zigzag mechanical crimps or spiral steric crimps are preferably imparted to the composite staple fibers. The number of crimps is preferably from 8 to 20 crimps, per 25 mm, and the crimp percentage is preferably from 6 to 18%. When a desired nonwoven fabric is required to have a high density, use of straight staple fibers having no crimp is preferred.

The thickness of the nonwoven fabric of the invention is preferably from 0.05 to 10 mm, and more preferably from 0.2 to 5 mm. When the thickness is less than 0.05 mm, the stiffness and elasticity of the nonwoven fabric sometimes becomes insufficient. Moreover, when the thickness exceeds 10 mm, the fabric is sometimes hard to handle.

The stiffness, in accordance with the Clark method, of the nonwoven fabric of the present invention is preferably from 0.5 to 10 cm, and more preferably from 2 to 7 cm. When the stiffness is less than 0.5 cm, the nonwoven fabric thus obtained sometimes has inadequate self-supporting properties. Moreover, when the stiffness exceeds 10 cm, the fabric becomes so stiff that the practical flexibility sometimes becomes insufficient.

EXAMPLES

The present invention will be further explained by making reference to the following examples which are not intended to restrict the scope of the present invention in any way. In addition, an intrinsic viscosity, a color tone, metal contents and an amount of a deposit layer formed in a spinneret were determined by the measurements described below.

(1) Intrinsic Viscosity

The viscosity of a solution of a polyester polymer in o-chlorophenol at 35° C. was measured, and the intrinsic viscosity of the polyester polymer was calculated from the measurement data.

(2) Color Tone (Color L* Value and Color b* Value

A sample of a polyester polymer was melted in vacuum at a temperature of 290° C. for 10 minutes. The molten polymer was formed into a plate-like form having a thickness of 3.0 mm±1.0 mm on an aluminum plate. The plate-formed specimen was rapidly cooled in ice water immediately after formation. The plate-shaped specimen thus obtained was dried and crystallized at 160° C. for 1 hour. The specimen was placed on a white color standard plate for a differential colorimeter adjustment, and the color L* value and b* value of the specimen surface are measured with a Hunter differential calorimeter (model: CR-200) manufactured by Minolta K. K. The L* value designates a brightness, and the larger the L* value, the higher the brightness of the specimen. The larger the b* value, the higher the degree of yellowness.

(3) Metal Content

When the catalyst was in the state of a solution, the catalyst solution was filled in a liquid cell to provide a specimen. When the catalyst was contained in a polyester polymer, a sample of the polyester polymer to be tested was heated and melted on an aluminum plate, and the molten polymer was formed into a molded body having a flat face with a compression press to provide a specimen. Each specimen was used for determining the titanium atomic concentration and phosphorus atomic concentration in the specimen. Each specimen was subjected to a fluorescence X-ray analyzer (System 3270 Type, manufactured by Rigaku Denki Kogyo Co., Ltd.), and the concentrations of titanium atoms and phosphorus atoms were quantitatively analyzed. Moreover, the titanium and phosphorus atomic concentrations of a reaction deposit type catalyst are measured by the following procedure. A dried specimen was placed in a scanning electron microscope (SEM, S570 type, manufactured by Hitachi Instruments Service Co., Ltd.), and the specimen was quantitatively analyzed with an energy dispersion type X-ray microanalyzer (XMA, Model EMAX-7000, manufactured by Horiba Mfg. Co., Ltd.) connected to the SEM.

(4) Amount of Diethylene Glycol (DEG)

A sample of a polyester polymer was decomposed with hydrazine hydrate, and the decomposition products were supplied to a gas chromatography apparatus (263-70, manufactured by Hitachi, Ltd.), followed by determining the content (% by mass) of diethylene glycol.

(5) Height of Foreign Matter Layer Adhered to Spinneret

A polyester polymer was formed into the form of chips, and the chips were melted at 290° C. The molten polyester polymer was melt-extruded through a spinneret having 12 extrusion holes with a diameter of 0.15 mm, and melt-spun at a spinning rate of 600 m/min for 2 days. Thereafter, the height of a foreign matter layer accumulated on around the outer periphery of the extrusion nozzle of the spinneret is measured. When the height of the sticking foreign matter layer is large, bending is likely to take place, in the filamentary stream of the extruded polyester melt, and the formability of the polyester decreases. That is, the height of the sticking matter layer generated around the spinneret is an index of the formability of the polyester.

(6) Tensile Strength and Ultimate Elongation of Nonwoven Fabric

A specimen of a nonwoven fabric was subjected to a constant rate stretch type tensile tester, and the tensile strength and the ultimate elongation of the specimen was measured in accordance with JIS P 8113.

(7) Variation in Quality

The variation in quality of a nonwoven fabric is represented by the standard deviation value (n=30) of a tensile strength (the smaller the value, the lower the variation and the higher the unformity of the quality).

Example 1

A mixture of 100 parts by mass of dimethyl terephthalate and 70 parts, by mass, of ethylene glycol was placed in a stainless steel vessel in which a pressurized reaction could be conducted, and 0.009 parts, by mass, of tetra-n-butyl titanate was further mixed with the mixture. The reaction mixture thus obtained was subjected to a transesterification reaction at a pressure of 0.07 MPa while being heated to temperature from 140 to 240° C., and the reaction was finished by adding 0.004 parts, by mass, of triethyl phosphonoacetate.

The reaction products thus obtained were transferred to a polycondensation vessel, and heated to 290° C., and a polycondensation reaction was conducted at a vacuum degree as high as up to 26.67 Pa to give a polyester polymer (containing no delustering agent) having an intrinsic viscosity of 0.60, a diethylene glycol content of 1.5%, and a melting point of 254° C.

The polyester polymer thus obtained was continuously extruded in the form of a strand from the extruding portion of the reaction vessel. The extruded polymer was cooled, and cut to provide particulate pellets having a length of about 3 mm. Table 1 shows the quality of the polyethylene terephthalate thus obtained. Separately from the above preparation of pellets, a hot melt-adhesive polyester copolymer (containing no delustering agent) was prepared from an acid component prepared by mixing terephthalic acid and isophthalic acid in a molar ratio of 60/40 and a diol component prepared by mixing ethylene glycol and 1,6-hexanediol in a molar ratio of 85/15 and having an intrinsic viscosity of 0.36 and a softening point of 70° C. was produced using the same catalyst as mentioned above. Chips of the polyester copolymer were produced in the same manner as mentioned above. Both types of chips were fed to a melt spinning apparatus for producing concentric core-in-sheath type composite filaments. The resultant filaments were further drawn, and cut to provide core-in-sheath type composite polyester staple fibers (with a core-to-sheath mass ratio of 50/50, a thickness of 2.2 dtex, and a fiber length of 5 mm). The core-in-sheath type composite polyester fibers in which the sheath portion was formed from the hot melt-adhesive polyester copolymer were mixed with beaten wood pulp in a mass mixing ratio of 60/40. The fiber mixture was fed to an air-laid machine to provide a web having a basis weight of 50 g/m². The web was heat treated at 180° C. for 10 minutes with an air-through drier. Table 1 shows the physical properties of the resultant nonwoven fabric.

Reference Example 1

Method for Synthesizing Titanium Trimellitate

Tetrabutoxytitanium was mixed into an ethylene glycol solution containing trimellitic anhydride in a content of 0.2%, in a molar ratio of tetrabutoxytitanium to trimellitic anhydride of 1/2. The reactants were reacted at 80° C. for 60 minutes in the air atmosphere at the ambient atmospheric pressure. The reaction products were cooled to room temperature, and recrystallized from acetone in an amount of 10 times that of ethylene glycol. The precipitates thus obtained were collected by filtering with a paper filter, and dried at 100° C. for 2 hours to provide the target compound for catalyst.

Example 2

A polyester polymer, polyester composite staple fibers and a nonwoven fabric were produced in the same manner as in Example 1, except that 0.016 parts of titanium trimellitate synthesized by the method in the above reference example was used as the titanium compound for catalyst. Table 1 shows the test results.

Examples 3 to 5, Comparative Examples 1 to 3

In each of Examples 3 to 5 and Comparative Examples 1 to 3, a polyester polymer, polyester composite staple fibers and a nonwoven fabric were produced in the same manner as in Example 1 except that compounds shown in Table 1 were used as a titanium compound and a phosphorus compound for catalyst, respectively in amounts shown in Table 1. Table 1 shows the test results.

Example 6

A nonwoven fabric was produced in the same manner as in Example 1 except that the mixture of the core-in-sheath type composite staple fibers and the beaten wood pulp was fed to a roller carding machine during the production of a nonwoven fabric to form a web having a basis mass of 100 g/m². The web was fed to a needle punching machine so that the fibers were interlaced to provide a dry method nonwoven fabric. Table 1 shows the test results.

Example 7

Core-in-sheath composite type polyester staple fibers (a core-to-sheath mass ratio of 50/50, a thickness of 2.2 dtex, a fiber length of 5 mm) prepared in the same manner as in Example 1 were mixed with beaten wood pulp in a mass mixing ratio of 60/40. The mixture was fed to an air-laid machine to form a web having a basis weight of 50 g/m². The web was heat treated at 180° C. for 10 minutes with an air-through drier. Table 1 shows the test results of the air-laid nonwoven fabric.

Comparative Example 4

A mixture of 100 parts by mass of dimethyl terephthalate and 70 parts by mass of ethylene glycol was placed in a stainless steel vessel in which a reaction under pressure could be conducted, and 0.064 part by mass of calcium acetate monohydrate was further mixed into the mixture. The reaction mixture was subjected to a transesterification reaction under a pressure of 0.07 MPa while being heated to temperature from 140 to 240° C., and the reaction was ended by adding 0.044 parts, by mass, of an aqueous solution containing 56% by mass of phosphoric acid into the reaction system.

The reaction products thus obtained were transferred to a polycondensation vessel, and $Sb_2O_3$ in an amount shown in Table 1 was added, followed by heating the contents to 290° C. A polycondensation reaction was conducted at a high vacuum of up to 26.67 Pa to provide a polyester polymer. From the polyester polymer thus obtained, fibers and a nonwoven fabric were produced in the same manner as in Example 1. Table 1 shows the test results.

TABLE 1

| | Catalyst | | | | | | |
|---|---|---|---|---|---|---|---|
| | Titanium compound | | Phosphorus compound | | Sb compound | | |
| | Type | Content (mmol %) | Type | Content (mmol %) | $(Sb_2O_3)$ (mmol %) | P/Ti $M_P/M_{Ti}$ | $M_{Ti}/M_P$ (mmol %) |
| Ex. 1 | TBT | 5 | TEPA | 30 | — | 6 | 35 |
| Ex. 2 | TMT | 5 | TEPA | 30 | — | 6 | 35 |
| Ex. 3 | TMT | 5 | PEE | 30 | — | 6 | 35 |
| Ex. 4 | TMT | 3 | TEPA | 15 | — | 5 | 18 |
| Ex. 5 | TMT | 7 | TEPA | 50 | — | 7 | 57 |
| Ex. 6 | TBT | 5 | TEPA | 30 | — | 6 | 35 |
| Ex. 7 | TBT | 5 | TEPA | 30 | — | 6 | 35 |
| C. Ex. 1 | TMT | 5 | TEPA | 90 | — | 18 | 95 |
| C. Ex. 2 | TMT | 9 | TEPA | 100 | — | 11.1 | 109 |
| C. Ex. 3 | TMT | 2 | TEPA | 7 | — | 3.5 | 9 |
| C. Ex. 4 | — | — | — | — | 31 | — | — |

TABLE 1-continued

| | Polyester polymer | | | Physical properties of nonwoven fabric | | | |
|---|---|---|---|---|---|---|---|
| | Intrinsic | Color tone | | Production | Breaking length | Elongation | |
| | viscosity | L* value | b* value | method | (km) | (%) | Variation |
| Ex. 1 | 0.620 | 79.0 | 3.0 | Air laid | 0.15 | 4.6 | 0.07 |
| Ex. 2 | 0.620 | 80.0 | 2.8 | Air laid | 0.16 | 4.8 | 0.09 |
| Ex. 3 | 0.620 | 78.0 | 3.0 | Air laid | 0.18 | 4.9 | 0.09 |
| Ex. 4 | 0.600 | 80.0 | 2.3 | Air laid | 0.16 | 4.7 | 0.07 |
| Ex. 5 | 0.600 | 80.0 | 3.3 | Air laid | 0.15 | 5.9 | 0.09 |
| Ex. 6 | 0.620 | 79.0 | 3.0 | Dry type | 0.11 | 18 | 0.06 |
| Ex. 7 | 0.620 | 79.0 | 3.0 | Air laid | 0.19 | 1.9 | 0.09 |
| C. Ex. 1 | 0.520 | 83.0 | 0.0 | Air laid | 0.14 | 4.9 | 0.3 |
| C. Ex. 2 | 0.600 | 78.0 | 3.0 | Air laid | 0.16 | 3.4 | 0.3 |
| C. Ex. 3 | 0.600 | 80.0 | 2.0 | Air laid | 0.14 | 2.3 | 0.2 |
| C. Ex. 4 | 0.620 | 78.0 | 3.0 | Air laid | 0.12 | 2.1 | 0.3 |

Note:
TBT: tetra-n-butoxytitanium
TMT: titanium trimellitate
TEPA: triethyl phosphonoacetate
PEE: diethyl carboethoxymethanephosphonate Example 8

Preparation of Titanium Compound

Ethylene glycol in an amount of 919 g and 10 g of acetic acid were placed in a 2-liter three-necked flask having a mixing and stirring function, and stirred and mixed. Titanium tetrabutoxide in an amount of 71 g was slowly added to the mixture to give an ethylene glycol solution (transparent) containing a titanium compound. The solution will be referred to as the "TB solution" hereinafter. The titanium atomic concentration of the solution was 1.02% by mole.

Preparation of Phosphorus Compound

Ethylene glycol in an amount of 656 g was placed in a 2-liter three-necked flask having a mixing and stirring function, and heated to 100° C. with stirring. When the temperature of ethylene glycol reached 100° C., 34.5 g of monolauryl phosphate was mixed therewith, and dissolved therein while heating and stirring, to provide a transparent solution. The solution will be referred to as the "P1 solution" hereinafter.

Preparation of Catalyst

The TB solution in an amount of 310 g was slowly mixed into the P1 solution in an amount of about 690 g kept at a temperature of 100° C. while stirring the P1 solution. After entirely adding the TB solution, the reaction mixture solution was stirred at a temperature of 100° C. for 1 hour to complete the reaction between the titanium compound and the phosphorus compound. The mixing ratio of the TB solution and the P1 solution was adjusted so that the molar ratio of phosphorus atoms to titanium atoms became 2.0/1. As the reaction products thus obtained were insoluble in ethylene glycol, the reaction mixture solution appeared in a cloudy state, and the reaction products were suspended as fine precipitates. The solution will be referred to as the "TP1-2.0 catalyst" hereinafter.

In order to analyze the composition of the TP1-2.0 catalyst thus obtained, a part of the catalyst was filtered through a filter of 5 μm-meshes, and the precipitated reaction products were collected as a solid fraction, followed by washing and drying the solid fraction. As a result of analyzing the elemental concentration of the precipitated reaction products thus obtained by XMA analysis, the reaction products were found to contain 12.0% by mass of titanium and 16.4% by mass of phosphorus. The molar ratio of the phosphorus atoms to the titanium atoms was 2.1/1. Moreover, when the reaction products were subjected to solid NMR analysis, the following results were obtained.

Disappearance of the peaks of the chemical shifts at 14, 20 and 36 ppm derived from the butoxide of titanium tetrabutoxide was observed by the measurement method of C-13 CP/MAS (frequency of 75.5 Hz). Moreover, a new chemical shift peak at 22 ppm that had not existed in monolauryl phosphate was confirmed by P-31 DD/MAS (frequency of 121.5 Hz). It was clearly confirmed from the results that the precipitates thus obtained in the present example are composed of a compound produced by the reaction between the titanium compound and the phosphorus compound.

A reaction mixture slurry prepared by mixing 179 parts by mass of highly pure terephthalic acid and 95 parts by mass of ethylene glycol was supplied at a constant rate to a reaction vessel where 225 parts by mass of an oligomer (oligomer of terephthalate diester of ethylene glycol) remained in a nitrogen atmosphere maintained at the ambient atmospheric pressure while stirring the contents at 255° C. The esterification reaction was conducted for 4 hours, while water and ethylene glycol produced by the reaction were being distilled off the reaction system, to complete the reaction. The degree of esterification was then 98% or more, and the polymerization degree of the oligomer produced was from about 5 to 7.

The oligomer in an amount of 225 parts obtained by the esterification reaction was transferred to a polycondensation vessel, and 3.34 parts of the TP1-2.0 catalyst prepared above was charged thereinto. Subsequently, the reaction temperature was raised stepwise from 255° C. to 280° C., and the reaction pressure was reduced stepwise from the atmospheric pressure to 60 Pa to effect the polycondensation reaction. Water and ethylene glycol generated by the reaction was removed from the reaction system.

The progress of the polycondensation reaction was confirmed while the load applied to the stirring blades in the reaction system was being monitored, and the reaction was finished at the time when the polymerization degree reached the target level. Thereafter, the reaction products within the system were continuously extruded in the form of a strand through the discharging portion of the reaction vessel. The extruded polymer was cooled and cut to give particulate pellets having a particle size of about 3 mm. Table 1 shows the quality of the polyethylene terephthalate polymer (melting point of 258° C.) thus obtained. Moreover, using the same catalyst, a copolymer having an intrinsic viscosity of 0.36 and a softening point of 70° C. was produced from an acid component prepared by mixing terephthalic acid and isophthalic acid in a molar ratio of 60/40 and a diol component prepared by mixing ethylene glycol and 1,6-hexanediol in a molar ratio of 85/15; pellets were produced from the copolymer. Core-in-sheath composite type polyester staple fibers (with a core-to-sheath mass ratio of 50/50, a thickness of 2.2 dtex, and a fiber length of 5 mm) were produced from both types of the polymer pellets using a melt spinning apparatus for producing concentric core-in-sheath type composite filaments, a drawing apparatus and a cutting apparatus. The sheath portions of the composite fibers were formed from the above mentioned copolymer. The core-in-sheath composite type polyester staple fibers and beaten wood pulp were mixed in a mass proportion of 60/40. The resultant fiber mixture was fed to an air-laid machine to form a web having a basis weight of 50 g/m². The web was heat treated at 180° C. for 10 minutes with an air-through drier. Table 2 shows the physical properties of the nonwoven fabric thus obtained.

Example 9

A nonwoven fabric was produced in the same manner as in Example 1 except that monobutyl phosphate was used in place of monolauryl phosphate, during preparation of the catalyst, and the addition amount and the reaction conditions were altered as described below.

Monobutyl phosphate in an amount of 28.3 g was dissolved in 537 g of ethylene glycol by heating. The solution will be referred to as the "P2 solution" hereinafter. The TB solution in an amount of 435 g was mixed with the P2 solution to prepare a reaction product. The mixing ratio of the TB solution and the P2 solution was 2.0:1 in terms of a molar ratio of phosphorus atoms to titanium atoms. The catalyst thus obtained will be referred to as the "TP2-2.0 catalyst" hereinafter. The heating temperature in the above reaction was 70° C., and the reaction time was 1 hour.

In order to analyze the reaction precipitates thus obtained, a part of the reaction solution was filtered through a filter of 5 μm-meshes, and the precipitated reaction products were collected as a solid fraction, followed by water washing and drying the solid fraction. As a result of analyzing the elemental concentration of the precipitated reaction products thus obtained, the reaction products were found to contain 17.0% by mass of titanium and 21.2% by mass of phosphorus. The molar ratio of phosphorus atoms to titanium atoms was 1.9/1. Table 2 shows the test results.

Example 10

A nonwoven fabric was produced in the same manner as in Example 1 except that a preparation amount of the TP1 solution and an addition amount of the TB solution were altered as described below.

Monolauryl phosphate in an amount of 31.3 g was dissolved in 594 g of ethylene glycol by heating. The solution will be referred to as the "P3 solution" hereinafter. The TB solution in an amount of 375 g was mixed into the P3 solution, to allow a reaction to be conducted and to provide a reaction product. The mixing ratio of the TB solution to the P3 solution was 1.5:1 in terms of a molar ratio of phosphorus atoms to titanium atoms. The catalyst thus obtained will be referred to as "TP3-1.5 catalyst" hereinafter. Table 2 shows the test results.

Example 11

A nonwoven fabric was produced in the same manner as in Example 2 except that a preparation amount of the TP2 solution and the amount of the TB solution added to the TP2 solution were altered as described below.

Monobutyl phosphate in an amount of 33.0 g was dissolved in 627 g of ethylene glycol by heating. The solution will be referred to as the "P4 solution" hereinafter. The TB solution in an amount of 340 g was placed in the P4 solution, to allow a reaction to be conducted and to provide a reaction product. The mixing ratio of the TB solution to the P4 solution was 3.0:1 in terms of a molar ratio of phosphorus atoms to titanium atoms. The catalyst thus obtained will be referred to as the "TP4-3.0 catalyst" hereinafter. Table 2 shows the test results.

Comparative Example 5

A nonwoven fabric was produced in the same manner as in Example 1 except that as a polycondensation catalyst, an ethylene glycol solution containing 1.3% of antimony trioxide was used in an amount of 4.83 parts by mass, and 0.121 part by mass of an ethylene glycol solution containing 25% of trimethyl phosphate was charged as a stabilizing agent into the reaction system. Table 2 shows the test results.

Comparative Example 6

A nonwoven fabric was produced in the same manner as in Example 1 except that only the same TB solution as prepared in Example 1 was used as a polycondensation catalyst in an amount of 1.03 part by mass, and the polycondensation reaction time was changed to 95 minutes. Table 2 shows the test results.

Comparative Example 7

A nonwoven fabric was produced in the same manner as in Example 1 except that a mixture of the TB solution with the P1 solution was used as a polycondensation catalyst without reacting the two solutions with each other, and 1.03 parts of the TB solution and 2.30 parts of the P1 solution were separately charged into the polycondensation reaction system during production of the polyester. Table 2 shows the test results.

Comparative Example 8

A nonwoven fabric was produced in the same manner as in Example 2 except that a mixture of the TB solution with the P2 solution was used as a polycondensation catalyst without reacting the two solutions with each other, and 1.03 parts by mass of the TB solution and 2.3 parts by mass of the P2 solution were separately charged into the polycondensation reaction system during production of the polyester. Table 2 shows the test results.

TABLE 2

| | Catalyst | | | Polyester polymer | | | | Nonwoven fabric | | |
|---|---|---|---|---|---|---|---|---|---|---|
| | Catalyst type | Catalyst content Ti/P[2] | P/Ti ratio[1] | Intrinsic viscosity | Color tone L* | Color tone b* | Production method | Breaking length (warp) (Km) | Stiffness flexibility (warp) (cm) | Quality variation |
| Ex. 8 | TP1-2.0 | 52/64 | 2.0 | 0.64 | 81 | 2.0 | A-L[3] | 0.12 | 4.6 | 0.06 |
| Ex. 9 | TP2-2.0 | 48/60 | 2.0 | 0.64 | 81 | 2.2 | A-L[3] | 0.13 | 5.6 | 0.03 |
| Ex. 10 | TP3-1.5 | 32/38 | 1.5 | 0.64 | 81 | 3.0 | Wet[4] | 0.16 | 2.1 | 0.05 |
| Ex. 11 | TP4-3.0 | 152/260 | 3.0 | 0.64 | 81 | 2.4 | Wet[4] | 0.19 | 1.9 | 0.05 |
| C. Ex. 5 | Sb$_2$O$_3$ | 250(Sb) | — | 0.64 | 75 | 2.5 | A-L[3] | 0.11 | 2.4 | 0.3 |
| C. Ex. 6 | TB soln. | 52/— | — | 0.64 | 81 | 8.0 | A-L[3] | 0.12 | 2.1 | 0.2 |
| C. Ex. 7 | TB + P1 soln. | 52/56 | — | 0.64 | 81 | 7.6 | A-L[3] | 0.14 | 2.5 | 0.13 |
| C. Ex. 8 | TB + P2 soln. | 52/56 | — | 0.64 | 81 | 7.9 | Wet[4] | 0.13 | 1.9 | 0.13 |

Note:
[1]: P/Ti ratio = a molar ratio of P atoms to Ti atoms
[2]: Ti/P = Ti (ppm)/P (ppm)
[3]: A-L = Air laid method
[4]: Wet = Wet method
L* = L* value
b* = b* value

INDUSTRIAL APPLICABILITY

The nonwoven fabric of the present invention has a good color tone (L* value, b* value), uniform and stabilized quality and, particularly, has considerable practical utility in applications to be contacted with food, for example, food packaging materials, filter materials for food, food harshness-removing sheets for food, oil filter sheets, sheets for kitchen wipers, sheets for reverse osmosis base materials, sanitary materials, filter materials for beverages, etc.

What is claimed is:

1. A nonwoven fabric comprising heat-adhesive composite staple fibers comprising a hot melt-adhesive polymer and a fiber-forming thermoplastic polymer,
wherein:
the hot melt-adhesive polymer forms a portion of the periphery of each composite staple fiber extending along the longitudinal direction of the composite staple fiber, and the fiber-forming thermoplastic polymer forms the remaining portion of each composite staple fiber;
the fiber-forming thermoplastic polymer is a polyethylene terephthalate polymer produced by using a polycondensing catalyst;
the catalyst comprises at least one member selected from mixtures (1) and reaction products (2) as specified below;
the mixture (1) for the catalyst comprises:
(A) titanium compound component comprising at least one member selected from the group consisting of:
 (a) titanium alkoxides represented by the general formula (I):

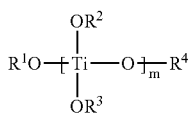

in which formula (I), $R^1$, $R^2$, $R^3$ and $R^4$ respectively and independently from each other represent a member selected from alkyl groups having 1 to 20 carbon atoms and a phenyl group, m represents an integer of 1 to 4, and when m represents an integer of 2, 3 or 4, the 2, 3 or 4 $R^2$s and $R^3$s may be, respectively, the same as each other or different from each other, and (b) reaction products of the titanium alkoxides of the general formula (I) with aromatic polycarboxylic acids represented by the formula (II):

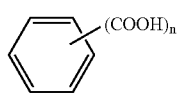

in which formula (II), n represents an integer of 2 to 4, or anhydrides of the acids of the formula (II), and (B) phosphorus compound component comprising at least one phosphorus compound represented by the general formula (III):

in which formula (III), $R^5$, $R^6$ and $R^7$ respectively and independently from each other represent an alkyl group having 1 to 4 carbon atoms, and X represents a member selected from a —$CH_2$— group and a —CH(Y)-group (wherein Y represents a phenyl group), the mixture (1) for the catalyst for the polycondensation being employed in an amount satisfying the requirements represented by the following expressions of relation (i) and (ii):

$$1 \leq M_p/M_{Ti} \leq 15 \quad \text{(i)}$$

and $$10 \leq M_p + M_{Ti} \leq 100 \quad \text{(ii)}$$

wherein $M_{Ti}$ represents a ratio in % of a value in millimole of titanium element contained in the titanium compound component (A) to a value in mole of the aromatic dicarboxylate ester, and $M_p$ represents a ratio in % of a value in millimole of phosphorus element contained in the phosphorus compound component (B) to the value in mole of the aromatic dicarboxylate ester; and the reaction products (2) for the catalyst comprise: a component (C) reacted with a component (D), in which reaction products (2), the component (C) comprises at least one member selected from the group consisting of (c) titanium alkoxides represented by the general formula (IV):

(IV)

in which formula (IV), $R^8$, $R^9$, $R^{10}$ and $R^{11}$ respectively and independently from each other represent an alkyl group having 1 to 20 carbon atoms, p represents an integer of 1 to 3, and when p represents an integer of 2 or 3, 2 or 3 $R^9$s and $R^{10}$s may be, respectively, the same as each other or different from each other, and (d) reaction products of the titanium alkoxides of the general formula (IV) with aromatic polycarboxylic acids represented by the above-mentioned general formula (II) or anhydride of the acids, and the component (D) comprises at least one phosphorus compound represented by the general formula (V):

(V)

in which formula (V), $R^{12}$ represents an alkyl group having 1 to 20 carbon atoms or an aryl group having 6 to 20 carbon atoms, and q represents an integer of 1 or 2, and the nonwoven fabric has a basis mass of 10 to 500 g/m².

2. The polyester composite staple fiber nonwoven fabric as claimed in claim 1 wherein, in each of the component (A) of the mixture (1) and the component (C) of the reaction products (2) for the catalyst, a reaction molar ratio of each of titanium alkoxides (a) and (c) to the aromatic polycarboxylic acid of the general formula (II) or the anhydride thereof is in the range of from 2:1 to 2:5.

3. The polyester composite staple fiber nonwoven fabric as claimed in claim 1 wherein, in the reaction product (2) for the catalyst, a reaction amount ratio of the component (D) to the component C is in the range of, in terms of ratio (P/Ti) of the molar amount of phosphorus atoms contained in the component (D) to the molar amount of titanium atoms contained in the component (C), from 1:1 to 3:1.

4. The polyester composite staple fiber nonwoven fabric as claimed in claim 1, wherein the phosphorus compound of the general formula (V) for the reaction product (2) is selected from monoalkyl phosphates.

5. The polyester composite staple fiber nonwoven fabric as claimed in claim 1, wherein the polyester polymer has an L* value of 77 to 85 and a b* value of 2 to 5, determined in accordance with the L*a*b* color specification of JIS Z 8729.

6. The polyester composite staple fiber nonwoven fabric as claimed in claim 1, wherein the composite staple fibers have a side-by-side type structure.

7. The polyester composite staple fiber nonwoven fabric as claimed in claim 1, wherein the composite staple fibers have a concentric or eccentric core-in-sheath type structure, the concentric or eccentric core portions of the composite staple fibers comprise the fiber-forming thermoplastic polymer, and the concentric or eccentric sheath portions of the composite staple fibers comprise the hot melt-adhesive polymer.

8. The polyester composite staple fiber nonwoven fabric as claimed in claim 1, wherein the mass ratio of the hot melt-adhesive polymer to the fiber-forming thermoplastic polymer is in the range of from 30:70 to 70:30.

9. The polyester composite staple fiber nonwoven fabric as claimed in claim 1, wherein the hot melt-adhesive polymer is selected from polyurethane elastomers, polyester elastomers, non-elastic polyester homopolymers and copolymers, polyolefin homopolymers and copolymers, and polyvinyl alcohol polymers.

10. The polyester composite staple fiber nonwoven fabric as claimed in claim 1, wherein the polyester composite staple fibers have an individual fiber thickness of 0.01 to 10 dtex and a fiber length of 5 to 100 mm.

11. The polyester composite staple fiber nonwoven fabric as claimed in claim 1, wherein the nonwoven fabric is one produced from the polyester composite staple fibers by a carding method, a paper-forming method or an air-laid method and is then heat treated.

12. The polyester composite staple fiber nonwoven fabric as claimed in claim 11, wherein the nonwoven fabric is subjected to a fiber-interlacing procedure before the heat treatment.

13. The polyester composite staple fiber nonwoven fabric as claimed in claim 1, wherein the polyester composite staple fibers are contained in the nonwoven fabric in a content of 25 to 100% by mass on the basis of the nonwoven fabric.

14. The polyester composite staple fiber nonwoven fabric as claimed in claim 1, wherein the polyester composite staple fiber nonwoven fabric is employed in a use in which the nonwoven fabric is brought into contact with food.

* * * * *